(12) United States Patent
Solduga Ramirez et al.

(10) Patent No.: US 8,968,454 B2
(45) Date of Patent: Mar. 3, 2015

(54) MAGENTA QUINACRIDONE PIGMENTS

(75) Inventors: Gemma Solduga Ramirez, Mannheim (DE); Janina Ohnsmann, Ludwigshafen (DE); Carsten Plueg, Muehlthal/Niederbeerbach (DE)

(73) Assignee: Clariant Finance (BVI) Limited, Tortola (VG)

( * ) Notice: Subject to any disclaimer, the term of this patent is extended or adjusted under 35 U.S.C. 154(b) by 107 days.

(21) Appl. No.: 13/638,890

(22) PCT Filed: Mar. 23, 2011

(86) PCT No.: PCT/EP2011/001457
§ 371 (c)(1),
(2), (4) Date: Oct. 1, 2012

(87) PCT Pub. No.: WO2011/124327
PCT Pub. Date: Oct. 13, 2011

(65) Prior Publication Data
US 2013/0029265 A1    Jan. 31, 2013

(30) Foreign Application Priority Data

Apr. 9, 2010   (EP) ..................................... 10003801

(51) Int. Cl.
*C09D 11/02* (2014.01)
*C09B 48/00* (2006.01)
*C09B 67/52* (2006.01)
*C09B 67/22* (2006.01)
*C09D 11/322* (2014.01)

(52) U.S. Cl.
CPC .......... *C09B 67/0027* (2013.01); *C09B 67/0036* (2013.01); *C09D 11/322* (2013.01)
USPC ........................................ 106/31.77; 106/495

(58) Field of Classification Search
CPC ........................... C09D 11/322; C09B 67/0036
USPC ............... 106/31.77, 495; 546/49, 56; 524/90
See application file for complete search history.

(56) References Cited

U.S. PATENT DOCUMENTS

| | | | | |
|---|---|---|---|---|
| 3,160,510 | A * | 12/1964 | Ehrich | 106/495 |
| 5,614,014 | A * | 3/1997 | Urban | 106/495 |
| 5,989,333 | A * | 11/1999 | Urban et al. | 106/495 |
| 6,117,605 | A * | 9/2000 | Chiba | 430/108.21 |
| 6,241,814 | B1 * | 6/2001 | Urban et al. | 546/49 |
| 6,251,553 | B1 * | 6/2001 | Baur et al. | 430/108.21 |
| 6,312,512 | B1 * | 11/2001 | Urban et al. | 106/495 |
| 7,166,158 | B2 * | 1/2007 | Mitina et al. | 106/495 |
| 8,016,930 | B2 * | 9/2011 | Sato et al. | 106/31.6 |
| 8,038,783 | B2 * | 10/2011 | Shiono et al. | 106/31.6 |
| 8,092,583 | B2 * | 1/2012 | Shiono et al. | 106/31.6 |
| 8,277,551 | B2 * | 10/2012 | Shiono et al. | 106/31.6 |
| 8,613,508 | B2 * | 12/2013 | Yoshida et al. | 347/100 |

OTHER PUBLICATIONS

PCT International Search Report for PCT/EP2011/001457, mailed May 19, 2011.
PCT International Preliminary Report on Patentability for PCT/EP2011/001457, mailed Oct. 9, 2012.
Communication with the EPO for Application No. 10003801.7, date Apr. 4, 2012.

* cited by examiner

*Primary Examiner* — Helene Klemanski
(74) *Attorney, Agent, or Firm* — Anthony A. Bisulca

(57) ABSTRACT

The invention relates to single phase solid solutions containing 65 to 98 wt.-% unsubstituted quinacridone, 1 to 34 wt.-% 2,9-dimethylquinacridone and 1 to 10 wt.-% 2,9-dichloroquinacridone, relative to the total weight of the single phase solid solution.

15 Claims, No Drawings

MAGENTA QUINACRIDONE PIGMENTS

The invention relates to a novel magenta quinacridone pigment based on a single crystal phase solid solution.

More and more pigments are substituting dyes in inkjet ink formulations since the pigments exhibit much better light fastness, solvent stability and temperature stability. Although several magenta pigments for inkjet applications are commercially available, there is a need for a blue shaded magenta with high chroma in order to extend the colour gamut.

In contrast to physical mixtures wherein the color is usually a direct function of the additive effects of the two or more components, solid solutions give unpredictable and new hues, which make them very interesting when new pigments are searched.

As for single pigments, the crystal phase of the solid solution determines the colouristic and rheological properties of the pigment. These properties can only be reproducibly obtained if the solid solution is characterized by a single crystal modification. However, the formation of single crystal phases with solid solutions is not trivial, since they contain at least 2 pigments, which may tend to form their specific crystal phases and consequently a crystal phase mixture.

It was an object of the present invention to find a new blue shaded magenta quinacridone pigment with single crystal phase.

U.S. Pat. No. 3,160,510 describes the preparation of quinacridone solid solutions by acid pasting of the corresponding quinacridone mixture in concentrated sulfuric acid and further finish procedure in dimethylformamide at high temperatures. The inventors describe the formation of single crystal phases under certain conditions. However, this process is related with a high ecological impact due to the high quantities of sulfuric acid needed, the formation of undesired sulfonated quinacridone side products and the use of the toxic solvent dimethylformamide.

Alternatively, quinacridone solid solutions can be obtained by ring closure in polyphosphoric acid of a mixture of the corresponding aniloterephthalic acids followed by a finish procedure in alternative organic solvents such as alcohols. Unfortunately, we found that the solid solutions described in U.S. Pat. No. 3,160,510 are obtained as a mixture of crystal phases if the acid pasting process is replaced by the polyphosphoric acid process, which, as indicated above, hampers the reproducibility of the process and detriments the colouristic properties.

Surprisingly, the hereinafter described single crystal phase quinacridone solid solutions can be obtained by the polyphosphoric acid process when the solid solutions are composed of unsubstituted quinacridone, 2,9-dimethylquinacridone and 2,9-dichloroquinacridone in relative amounts outside the range suggested in U.S. Pat. No. 3,160,510.

The present invention therefore provides for novel single phase solid solutions containing 65 to 98 wt.-% unsubstituted quinacridone, 1 to 34 wt.-% 2,9-dimethylquinacridone and 1 to 10 wt.-% 2,9-dichioroquinacridone, relative to the total weight of the single phase solid solution.

Preferably, the solid solutions of the invention contain 69 to 90 wt.-% unsubstituted quinacridone, 2 to 25 wt.-% 2,9-dimethylquinacridone and 5 to 10 wt.-% 2,9-dichioroquinacridone, relative to the total weight of the single phase solid solution.

More preferably, the solid solutions of the invention contain 69 to 85 wt.-% unsubstituted quinacridone, 5 to 25 wt.-% 2,9-dimethylquinacridone and 5 to 10 wt.-% 2,9-dichioroquinacridone, relative to the total weight of the single phase solid solution.

In particular, the solid solutions of the invention consist of 65 to 98 wt.-%, preferably 69 to 90 wt.-%, more preferably 69 to 85 wt.-%, of unsubstituted quinacridone, 1 to 34 wt.-%, preferably 2 to 25 wt.-%, more preferably 5 to 25 wt.-%, of 2,9-dimethylquinacridone and 1 to 10 wt.-%, preferably 5 to 10 wt.-%, of 2,9-dichloroquinacridone, relative to the total weight of the quinacridone single phase solid solution.

The solid solution of the invention is identifiable by an X-ray pattern which is different to the addition of the X-ray patterns of each component, and particularly presents the following main lines from (Cu—K$\alpha_1$-radiation, 2θ data in grades, d data in Å$^{-1}$, measured at room temperature in transmission):

| 2θ | d | rel. intensity |
|---|---|---|
| 6.00 | 14.7 | 100 |
| 12.15 | 7.3 | 12 |
| 13.72 | 6.4 | 43 |
| 14.55 | 6.1 | 12 (shoulder) |
| 24.80 | 3.6 | 15 (shoulder) |
| 26.41 | 3.4 | 25 |
| 27.58 | 3.2 | 35 |

Depending on the solid solution and the measure accuracy the line position may vary ±0.2°. Further more, depending on the accuracy of the production process it may be possible to find small amounts of other quinacridone crystal phases in the X-ray pattern. In the case, that alpha-phase of P.R. 202 is present in the mixture the relative intensity between the peak at 11.03 2θ and the peak at 12.15 2θ may be up to 15%.

The solid solutions of the invention are characterized by a blue shaded magenta hue. According to CIELAB, the chroma is preferably 74>C>60, more preferred 70>C>64. The hue is preferably 34>h>20, more preferred 32>h>23. These values are determined in mass tone for an alkyd-melamine staving lacquer (AM); C (chroma) and h (hue) values are measured using a D65 illuminant and 10° observer, e.g a Minolta 3700, according to DIN 5033-7, ISO 7724-2.

The solid solutions of the invention can be prepared by condensing a mixture of the corresponding amounts of the respective anilinoterephthalic acids in polyphosphoric acid or ester, and submitting the crude pigment to a finish procedure at elevated temperature.

In order to obtain the solid solution of the present invention, 65 to 98 wt.-%, preferably 69 to 90 wt.-%, more preferably 69 to 85 wt.-%, of anilinoterephthalic acid, 1 to 34 wt.-%, preferably 2 to 25 wt.-%, more preferably 5 to 25 wt.-%, of 2,9-dimethylanilinoterephthalic acid, and 1 to 10 wt.-%, preferably 5 to 10 wt.-%, of 2,9-dichloroanilinoterephthalic acid are condensed in polyphosphoric acid or its ester (83.5-86.0% $P_2O_5$), at 100 to 150° C., more preferably at 110 to 135° C., hydrolyzing the resulting melt with water or with aqueous ortho-phosphoric acid at a temperature of 0 to 150° C., preferably at 10 to 99° C. After filtration and washing, the crude pigment is treated with an organic solvent and/or water at a temperature of 80 to 180° C., more preferably at 90 to 150° C., optionally under pressure, expediently for 0.5 to 24 h, more preferably 1 to 10 h.

Convenient solvents for the organic solvent treatment are for example: acyclic hydrocarbons such as cyclohexane, $C_1$-$C_8$-alkanols, such as methanol, ethanol, n- or iso-propanol, n- or isobutanol, tert-butanol, pentanols, hexanols, cyclohexanol, polyhydric alcohols, such as ethylene glycol, propylene glycol, glycerol; $C_1$-$C_5$-dialkyl ketones or cyclic ketones, such as acetone, diethyl ketone, methyl isobutyl ketone, methyl ethyl ketone or cyclohexanone; ethers and glycol ethers, such as monomethyl or monoethyl ether of ethylene glycol or propylene glycol, butylglycol, ethyldiglycol or methoxybutanol; aromatic hydrocarbons, such as toluene, o-, m- or p-xylene or ethylbenzene, cyclic ethers, such as tetrahydrofuran, chlorinated aromatic hydrocarbons, such as chlorobenzene, o-dichlorobenzene, 1,2,4-trichlorobenzene or bromobenzene; benzoic acid, nitrobenzene, phenol; $C_1$-$C_4$-alkyl carboxylates, such as butyl formate, ethyl acetate or propyl propionate; carboxylic acid $C_1$-$C_4$-glycol esters, $C_1$-$C_4$-alkylphthalates and $C_1$-$C_4$-alkyl benzoates, such as ethyl benzoate; heterocyclic bases, such as pyridine, quinoline, morpholine or picoline; and also dimethyl sulfoxide and sulfone.

In principle, aliphatic carboxamides, such as formamide or dimethylformamide; cyclic carboamides, such as N-methylpyrrolidone, are workable, but should be avoided due to ecologic reasons.

Preferred solvents are alkanols, especially ethanol, propanols, butanols and pentanols; aromatic hydrocarbons, such as toluene, o-, m- or p-xylene or ethylbenzene; chlorinated aromatic hydrocarbons, such as chlorobenzene, o-dichlorobenzene.

Especially preferred are butanols, such as iso-butanol, pentanols, and chlorobenzene.

In order to improve the color properties and to obtain particular color effects, it is possible at any point in the process to add solvents, synergists, surfactants, defoamers, extenders, inorganic salts, such as sodium sulfate or other additives. It is also possible to use mixture of these additives. The additives can be added all at once or in two or more portions. The addition can be made before, during or after ring closure, during the hydrolysis, or during the finishing treatment, or during or after isolation.

Suitable surfactants are anionic, cationic and nonionic surfactants. Examples of suitable anionic surfactants are fatty acid taurides, fatty acid N-methyltaurides, fatty acid isethionates, alkylbenzene sulfonates, alkylnaphthalenesulfonates, alkylphenol polyglycol ether sulfates and fatty alcohol polyglycol ether sulfates, fatty acids, for example, palmitic, stearic and oleic acid, soaps, e.g. alkali metal salts of fatty acids, naphthenic acids and resins acids, e.g., abietic acid, and alkali-soluble resins, e.g., rosin-modified maleate resins.

Examples of suitable cationic surfactants are quaternary ammonium salts, fatty amine ethoxylates, fatty amine polyglycol ethers and fatty amines. Examples of non ionic surfactants are fatty alcohol polyglycol ethers, fatty acid polyglycol esters and alkylphenol polyglycol ethers.

In some application media, it is necessary to use a synergist in order to improve the rheological properties of the pigment used.

Therefore, the solid solution of the present invention can be combined, if required, with a synergist of the general formula Q-[A-Y]$_n$, wherein Q may be an unsubstituted quinacridone or a quinacridone substituted with halogen, alkyl, alkoxy, $H_2N$—CO—, alkyl-NH—CO— or (alkyl)$_2$-N—CO—; A represents a direct bond or —$CR^1R^2$—, —CO—, —$SO_2$—, —O—, —S—, $NR^1$— or aryl. e.g. phenyl, wherein $R^1$ and $R^2$ are hydrogen or $C_1$-$C_4$-alkyl, and Y represents a hydrogen, —$NR^3R^4$, —OH, $C_1$-$C_4$-alkyl, $C_1$-$C_4$-alkoxy, aryl, e.g. phenyl, the rest of a 5-, 6- or 7-membered heterocycle, —$SO_3$-ammonium or —$SO_3M$, wherein M is a metal, wherein $R^3$ and $R^4$ are hydrogen or $C_1$-$C_4$-alkyl rests which can be substituted with heterocycles, amines or amides and n is a number from 1 to 4. The combination of the solid solution and the synergist can take place in any step of the preparation of said solid solution. Usually the synergist is not part of the crystal lattice of the solid solution. If required, the synergist is added in an amount of from 0.01 to 10 wt.-%, preferably 0.1 to 5 wt.-%, relative to the total weight of solid solution and synergist.

For determined application fields, like inkjet inks, it may be necessary to purify the pigment from divalent and trivalent cations, which can be done by usual methods.

In order to shade the hue and to adapt it to the requirement of specific applications, the solid solution of the invention can be combined with further organic color pigments, inorganic pigments, and dyes.

Organic color pigments which can be employed to shade the hue can be selected from the group of the azo pigments or polycyclic pigments; yellow pigments, such as C.I. Pigment Yellow 155, P.Y. 139, P.Y. 83, P.Y. 181, P.Y. 191, P.Y. 75, P.Y. 180 or P.Y. 97; orange pigments, such as P.O. 62, P.O. 36, P.O. 34, P.O. 13, P.O. 36, P.O. 13, P.O. 43 or P.O. 5; red/magenta pigments, such as P.R. 57, P.R. 48, P.R. 122, P.R. 146, P.R. 154, P.R. 185, P.R. 184, P.R. 192, P.R. 202, P.R. 207, P.R. 206 or P.R. 209; and violet pigments, such as P.V.19, P.V. 23, P.V. 29, P.V. 35 or P.V. 37, P.V. 57 and also blue pigments, such as P.B. 15, P.B. 60 or P.B. 80.

Preferred dyes to shade the hue of the solid solution of the present invention are water-soluble dyes, such as Direct, Reactive and Acid Dyes, and also solvent-soluble dyes, such as Solvent Dyes, Disperse Dyes and Vat Dyes. Specific examples that may be mentioned are C.I. Reactive Yellow 37, Acid Yellow 23, Reactive Red 23, 180, Acid Red 52, Reactive Blue 19, 21, Acid Blue 9, Direct Blue 199, Solvent Yellow 14, 16, 25, 56, 64, 79, 81, 82, 83:1, 93, 98, 133, 162, 174, Solvent Red 8, 19, 24, 49, 89, 90, 91, 109, 118, 119, 122, 127, 135, 160, 195, 212, 215, Solvent Blue 44, 45, Solvent Orange 60, 63, Disperse Yellow 64, Vat Red 41.

The solid solutions of the present invention can be used to colour high molecular weight organic materials of natural or synthetic origin, such as plastics, resins, coatings materials and printing inks. Examples of high molecular weight organic materials are cellulose ethers and cellulose esters, such as ethylcellulose, nitrocellulose, cellulose acetate or cellulose butyrate, natural resins or synthetic resins, such as addition polymerization resins or condensation resins, examples being amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone, and silicone resins, individually or in mixtures.

In this context it is irrelevant whether the high molecular weight organic material referred to are in form of plastic masses, melts or in form of spinning solutions, varnishes, paints or printing inks. Depending on the intended application use it is advantageous to utilize the solid solutions of the present invention as blends or in form of preparations or dispersions. Based on the high molecular weight organic material to be colored, the solid solutions of the invention are employed in an amount of preferably from 0.1 to 10% by weight, relative to the total amount of the coloured material.

The solid solutions of the present invention are suitable for use as colorant in electrophotographic toner and developers, such as one- or two-component powder toners (so called one- or two-component developers), magnetic toners, liquid toners, latex toners, polymerization toners and specialty toners. Typical toner binders are addition polymerization resins, polyaddition resins and polycondensation resins, such as styrene resins, styrene-acrylate resins, styrene-butadiene resins, acrylate resins, polyester resins, phenol-epoxy resins, polysulfones, polyurethanes, individually or in combination, and also polyethylene and polypropylene, which may also contain further ingredients, such as charge control agents, waxes or flow aids, or may be modified subsequently with these additives.

Moreover, the solid solutions of the present invention are suitable colorants in powders and powder coating materials, especially in triboelectrically or electrokinetically sprayable powder coating materials which are used to coat the surface of articles made, for example, from metal, wood, plastic, glass, ceramic, concrete, textile material, paper or rubber.

Furthermore, the solid solutions of the present invention can be employed as colorants in inkjet inks on an aqueous or a non-aqueous basis and also in those inks which operate in accordance with the hot-melt process.

Inkjet inks generally include a total of 0.5 to 15% by weight, preferably 1.5 to 8% by weight, (reckoned dry) of one or more of the solid solutions according to the invention. Microemulsion inks are based on organic solvents and water with or without an additional hydrotropic substance (interface mediator). Microemulsion inks include 0.5 to 15% by weight, preferably 1.5 to 8% by weight, of one or more of the solid solutions according to the invention, 5 to 99% by weight of water and 0.5 to 94.5% by weight of organic solvent and/or hydrotropic compound. Solvent based inkjet inks preferably include 0.5 to 15% by weight of one or more solid solutions according to the invention, 85 to 99.5% by weight of organic solvent and/or hydrotropic compounds.

Hot-melt inks are based mostly on waxes, fatty acids, fatty alcohols or sulfonamides that are solid at room temperature and liquefy on heating, the preferred melting range lying between about 60° C. and about 140° C. Hot-melt inkjet inks consist essentially for example of 20 to 90% by weight of wax and 1 to 10% by weight of one or more of the solid solutions according to the invention. They may further include 0 to 20% by weight of an additional polymer (as "dye solvent"), 0 to 5% by weight of dispersant, 0 to 20% by weight of viscosity modifier, 0 to 20% by weight of plasticizer, 0 to 10% by weight of tack additive, 0 to 10% by weight of transparency stabilizer (prevents crystallization of waxes, for example) and also 0 to 2% by weight of antioxidant.

The solid solutions of the present invention can also be used as colorants for color filter, both in the additive and the subtractive mixture.

In the following examples parts refer to parts by weight and percentages to weight percent, unless otherwise indicated.

Preparation of Mass Tone Alkyd-Melamine Stoving Lacquer:

In a 150 ml plastic beaker 3.6 g solid solution and 26.4 g Alkyd-Melamine grinding medium (50% Vialkyd® AC 451 n/70SNB and 50% Solventnaphtha, le) are dispersed on the disperser with 85 g of glass beads of 3 mm diameter 30 min 660 rpm. This coloured lacquer is mixed slowly, stirring with glass rod in 60 g clear lacquer (26.4% Vialkyd AC 451n/70SNB, 29.4% Vialkyd AC 451/60X, 35.8% Maprenal MF600/55BIB, 2.2% Solventnaphtha, le, 2.2% n-Butanol, 2.2% Depanol I, 1.8% Butyldiglycol). The obtained paint is drawdown with a control coater as a uniform and regular 200 μm coating film onto a test card, which is dried at least 15 min at room temperature and 20 min at 140° C. The colour properties were measured using a Minolta 3700, D65 illuminant and 10° observer according to DIN 5033-7, ISO 7724-2.

EXAMPLE 1

In a 1 L reactor 300 parts polyphosphoric acid (85.3-85.5% $P_2O_5$) are heated to 110° C. At this temperature 85 parts 2,5-bis-phenylamino-terephthalic acid, 10 parts 2,5-bis-p-tolylamino-terephthalic acid and 5 part 2,5-bis-(4-chlorophenylamino)-terephthalic acid are added and stirred for 4 h at 145° C., while the ring-closure takes place. The melt is poured into 900 parts ortho-phosphoric acid (20% w) of 85° C. and stirred for 1 h. The crude pigment is filtered at room temperature and the press cake is washed with water to pH neutral. The press cake (equivalent to 1 part dry pigment) is suspended in 10 parts water and 4 parts iso-butanol and stirred for 5 h at 150° C. under pressure. At room temperature the pigment is filtered, washed with water solvent free and dried at 80° C. The obtained solid solution has the following X-ray diffraction angles 2θ: 6.0, 12.2, 13.7, 14.5, 25.0, 26.5, 27.6.

The so obtained blue shade magenta pigment has a mass tone hue according to CIELAB: C=67 and h=32 in mass tone for Alkyd-Melamine stoving lacquer (AM).

EXAMPLE 2

In a 1 L reactor 500 parts polyphosphoric acid (85.8-86% $P_2O_5$) are heated to 100° C. At this temperature 90 parts 2,5-bis-phenylamino-terephthalic acid, 2 parts 2,5-bis-p-tolylamino-terephthalic acid and 8 part 2,5-bis-(4-chlorophenylamino)-terephthalic acid are added and stirred for 5 h at 125° C., while the ring-closure takes place. The melt is poured into 1500 parts ortho-phosphoric acid (20% w) of 0° C. and stirred for 1 h. The crude pigment is filtered at room temperature and the press cake is washed with water to pH neutral. The press cake (equivalent to 1 part dry pigment) is suspended in 5 parts iso-butanol and 4 parts water, the pH is adjusted to 8-9 and stirred for 5 h under reflux. Iso-butanol is removed by steam distillation and the pigment is filtered at room temperature, washed neutral and dried at 80° C. The obtained solid solution has the following X-ray diffraction angles 2θ: 6.11, 12.37, 13.82, 14.34, 25.00, 26.24, 27.67.

The so obtained blue shade magenta pigment has a mass tone hue according to CIELAB: C=67 and h=29 in mass tone for AM.

EXAMPLE 3

In a 1 L reactor 500 parts polyphosphoric acid (85.8-86% $P_2O_5$) are heated to 100° C. At this temperature 80 parts 2,5-bis-phenylamino-terephthalic acid, 10 parts 2,5-bis-p-tolylamino-terephthalic acid and 10 parts 2,5-bis-(4-chlorophenylamino)-terephthalic acid are added and stirred for 5 h at 120° C., while the ring-closure takes place. The melt is poured into 1500 parts Ortho-phosphoric acid (20% w) of 0° C. and stirred for 1 h. The crude pigment is filtered at room temperature and the press cake is washed with water to pH neutral. The press cake (equivalent to 1 part dry pigment) is suspended in 5 parts iso-butanol and 4 parts water, and stirred for 5 h at 150° C. under pressure. Iso-butanol is removed by steam distillation and the pigment is filtered at room temperature, washed and dried at 80° C. The obtained solid solution has the following X-ray diffraction angles 2θ: 5.98, 12.14, 13.69, 14.44, 24.86, 26.45, 27.60.

The so obtained blue shade magenta pigment has a mass tone hue according to CIELAB: C=66 and h=31 in mass tone for AM.

COMPARATIVE EXAMPLE

In a 1 L reactor 500 parts polyphosphoric acid (85.8-86% $P_2O_5$) are heated to 100° C. At this temperature 60 parts 2,5-bis-phenylamino-terephthalic acid, 25 parts 2,5-bis-p-tolylamino-terephthalic acid and 15 part 2,5-bis-(4-chlorophenylamino)-terephthalic acid are added and stirred for 5 h at 120° C., while the ring-closure takes place. The melt is poured into 1500 parts ortho-phosphoric acid (20% w) of 0° C. and stirred for 1 h. The crude pigment is filtered at room temperature and the press cake is washed with water to pH neutral. The press cake (equivalent to 1 part dry pigment) is suspended in 5 parts iso-butanol and 4 parts water, and stirred for 5 h at 120° C. under pressure. Iso-butanol is removed by steam distillation and the pigment is filtered at room temperature, washed and dried at 80° C. The X-ray pattern of the obtained pigment shows the formation of an admixture of two crystal phases:

A solid solution crystal phase and the α-phase of P.R. 202;

X-ray diffraction angles 2θ: 5.55, 5.94, 11.05, 12.08, 13.75, 14.67, 24.85, 25.80, 26.54, 27.53, 30.26.

The so obtained pigment has a mass tone hue according to CIELAB: C=59 in mass tone for AM.

The invention claimed is:

1. A single phase solid solution comprising 65 to 98 wt.-% unsubstituted quinacridone, 1 to 34 wt.-% 2,9-dimethylquinacridone and 1 to 10 wt.-% 2,9-dichloroquinacridone, relative to the total weight of the single phase solid solution.

2. The single phase solid solution as claimed in claim 1, comprising 69 to 85 wt.-% unsubstituted quinacridone, 5 to 25 wt.-% 2,9-dimethylquinacridone and 5 to 10 wt.-% 2,9-dichloroquinacridone, relative to the total weight of the single phase solid solution.

3. The single phase solid solution as claimed in claim 1 consisting of 65 to 98 wt. % of unsubstituted quinacridone, 1 to 34 wt. % of 2,9-dimethylquinacridone and 1 to 10 wt.-%, 2,9-dichloroquinacridone, relative to the total weight of the quinacridone single phase solid solution.

4. The single phase solid solution as claimed in claim 1, having a chroma of 74>C>60, determined in mass tone for an alkyd-melamine stoving lacquer.

5. A method for preparing a single phase solid solution as claimed in claim 1, comprising the steps of condensing 65 to 98 wt.-% of anilinoterephthalic acid, 1 to 34 wt.-% of 2,9-dimethylanilinoterephthalic acid, and 1 to 10 wt.-% of 2,9-dichloroanilinoterephthalic acid in polyphosphoric acid or its ester at 100 to 150° C. to form a melt, hydrolyzing the melt with water or with aqueous ortho-phosphoric acid at a temperature of 0 to 150° C. to form the solid solution and isolating the solid solution.

6. The method as claimed in claim 5, comprising a solvent treatment with an organic solvent, water or both at a temperature of 80 to 180° C.

7. The method as claimed in claim 6, wherein the organic solvent is a butanol.

8. A high molecular weight organic material of natural or synthetic origin colored by the single phase solid as claimed in claim 1.

9. The high molecular weight organic material of natural or synthetic origin as claimed in claim 8, wherein the high molecular weight organic material is a plastic, resin or coating material.

10. The high molecular weight organic material of natural or synthetic origin claimed in claim 9, wherein the high molecular weight organic material of natural or synthetic origin is an electrophotographic toner, electrophotographic developer or a color filter.

11. An ink colored by the single phase solid solution as claimed in claim 1.

12. The ink as claimed in claim 11, wherein the ink is an inkjet ink.

13. The single phase solid solution as claimed in claim 1 consisting of 69 to 90 wt.-% of unsubstituted quinacridone, 2 to 25 wt.-% of 2,9-dimethylquinacridone and 5 to 10 wt.-%, of 2,9-dichloroquinacridone, relative to the total weight of the quinacridone single phase solid solution.

14. The single phase solid solution as claimed in claim 1 consisting of 69 to 85 wt.-% of unsubstituted quinacridone, 5 to 25 wt.-%, of 2,9-dimethylquinacridone and 5 to 10 wt.-%, of 2,9-dichloroquinacridone, relative to the total weight of the quinacridone single phase solid solution.

15. The method as claimed in claim 6, wherein the organic solvent is iso-butanol.

* * * * *